D3-395 AU 292 EX
H0527 OR D 22,493

June 13, 1944. R. BERNHARDT ET AL Des. Re. 22,493

CLAMP FOR BLANKETS AND THE LIKE

Original Filed April 15, 1943

Inventors:
Rudolph Bernhardt
and Jean O. Reinecke,
By Dawson, Orth and Booth,
Attorneys.

Reissued June 13, 1944

Des. Re. 22,493

UNITED STATES PATENT OFFICE 22,493

DESIGN FOR A CLAMP FOR BLANKETS AND THE LIKE

Rudolph Bernhardt and Jean O. Reinecke, Chicago, Ill., assignors to James F. Barnes, as trustee Original No. 136,730, dated November 30, 1943, Serial No. 109,974, April 15, 1943, for 3½ years. Application for reissue February 14, 1944, Serial No. 112,583

Term of patent 14 years (Cl. D17—6)

*To all whom it may concern:*

Be it known that we, Rudolph Bernhardt and Jean O. Reinecke, citizens of the United States, residing at Chicago, county of Cook, and State of Illinois, have invented a new, original, and ornamental Design for a Clamp for Blankets and the like, of which the following is a specification, reference being had to the accompanying drawing, forming a part thereof, in which—

Figure 1:
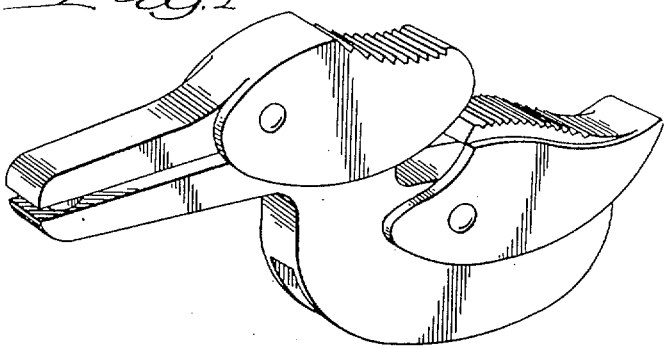
Figure 2:
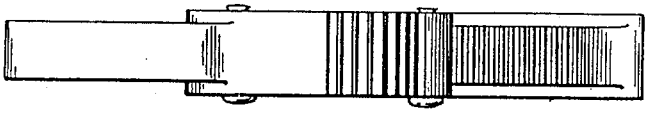
Figure 3:
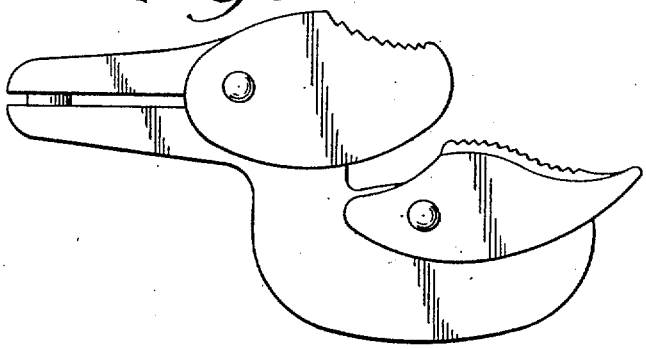

Fig. 1 is a perspective view of the device embodying our new design; Fig. 2 is a plan view of the same device; and Fig. 3 is a side elevational view of the same device.

We claim:

The ornamental design for a clamp for blankets and the like, as shown.

RUDOLPH BERNHARDT.
JEAN O. REINECKE.